United States Patent [19]

Talbot

[11] 4,105,724

[45] Aug. 8, 1978

[54] CONTACT PACKING

[75] Inventor: Edward Butterfield Talbot, London, England

[73] Assignee: Ruckluft Patent AG., Lucern, Switzerland

[21] Appl. No.: 620,714

[22] Filed: Oct. 8, 1975

[30] Foreign Application Priority Data

Nov. 13, 1974 [GB] United Kingdom ............... 49181/74

[51] Int. Cl.² ...................... B01D 39/16; B01D 47/00; B29C 17/02
[52] U.S. Cl. ........................................ 261/112; 55/525; 261/DIG. 72; 264/154; 264/DIG. 47; 428/116; 428/135; 428/136; 428/339
[58] Field of Search ....... 264/154, 145, 146, DIG. 47; 428/116, 119, 131, 135, 136, 339; 55/525; 261/112, DIG. 72

[56] References Cited

U.S. PATENT DOCUMENTS

| | | | |
|---|---|---|---|
| 2,582,777 | 1/1952 | Grozinger | 264/154 |
| 3,080,579 | 3/1963 | Gordon | 264/154 |
| 3,346,246 | 10/1967 | Loetel et al. | 261/DIG. 11 |
| 3,839,525 | 10/1974 | Doll | 264/154 |

Primary Examiner—James B. Lowe
Attorney, Agent, or Firm—Ladas, Parry, Von Gehr, Goldsmith & Deschamps

[57] ABSTRACT

A process for the production of a cellular material which comprises cutting in a planar sheet of material separate linear slits in a series of substantially parallel linear rows, subsequently subjecting the sheet to tension in a direction perpendicular to the linear rows, maintaining the tension until the slits have opened up to form cells and hardening the material in the desired cellular shape, and the cellular material so produced.

3 Claims, 3 Drawing Figures

CONTACT PACKING

This invention relates to a cellular material and more particularly to a cellular material suitable for contact packing, referred to herein as packing material, comprising gas/liquid contacting surfaces, such as used in cooling towers, absorption towers, gas-scrubbers, chemical reactors and biological oxidation plants. The invention also is concerned with a process for producing cellular material, particularly packing material.

Packing material for use in gas/liquid contacting apparatus and/or gas-scrubbers generally comprises a mass of suitable inert material arranged to present as large as possible a surface area of contact to the gas and liquid flowing therepast. Such packing material may comprise, for example, a supported mass of irregular or regular shaped pieces, offering a large surface area — to — bulk ratio, over and through which the gas and liquid are caused to flow in counter current. In the case of cooling towers, in particular, the packing may take the form of a number of rigid grid-like structures arranged in superposed spaced relation to one another, which arrangement is designed to break up and distribute the liquid falling freely through the tower so that maximum contact is established with the gas flowing upwardly through the tower and optimum cooling is achieved.

It is known that a significant factor in the cooling efficiency of any given packing material is the manner in which the surfaces thereof achieve a breaking up of the droplets of liquid flowing therethrough without significantly impeding the counter-current gas flow. A suitable form of contact packing comprising a composite structure including a plurality of elongated members is described and claimed in United Kingdom Patent Specification No. 1241324. It has now been found that an improved breaking up of the liquid droplets may be achieved with a cellular material which may be produced by a simple and cheap process and which possesses a high surface area per unit volume combined with characteristics which provide excellent redistributive effect within the packing and between the component layers.

Various types of cellular material, particularly material known as expanded metal or expanded plastic sheet, are known in the art but such material is generally made from a sheet which is stretched at the same time as it is made and, as a result, it is not possible to obtain the degree of stretch and vertical thickness which is obtained from a given thickness of sheet by the process of the present invention and without which the material is unsuitable for use in cooling towers.

In accordance with the present invention there is provided a process for the production of a cellular material from a planar sheet of material which is capable of setting in a desired configuration, if necessary after an intermediate softening step, which process comprises cutting in the said sheet separate linear slits in a series of substantially parallel linear rows to form an array wherein each of the slits in a given row is out of phase with each of the slits in the adjacent row, in a regular pattern as illustrated in FIG. 1 of the drawings subsequently subjecting the sheet to tension in a direction perpendicular to the linear rows of slits, while softening the material if required, maintaining the tension until the slits have opened up to form cells of substantially rectangular configuration when viewed in plan wherein each of the opposite side walls of each cell in a longitudinal direction has an intermediate point of inflexion and each of the opposite side walls of each cell in a transverse direction has a thickness equal to the sum of the thickness of each portion of the longitudinal side walls about the point of inflexion, and, causing the resulting cellular material to harden in the substantially rectangular configuration.

An essential feature of the process of the invention is that the sheet of material having the separate slits cut therein is subjected to tension to open up the slits subsequent to the making of the slits and not concurrently therewith. The effect of this is to convert the sheet from a substantially two dimensional object into a three dimensional object wherein the walls of the cells or openings for the passage of gas are in a plane which is inclined to the general plane of the material as a whole. Thus, if one considers the plane of the material to be the horizontal plane each of the walls of the cells will lie in a substantially vertical plane.

The cellular material made by the process described above may be produced in a continuous sheet which may then be cut up into separate portions of any desired size.

The present invention also provides a cellular material produced by the above-described process and comprising a plurality of cells formed in a three-dimensional integral array wherein the side walls of the cells lie in parallel planes which are substantially perpendicular to the general plane of the array, the opposite side walls of each cell in a longitudinal direction having an intermediate point of inflexion and the opposite side walls of each cell in a transverse direction having a thickness equal to the sum of the thickness of each portion of the longitudinal side walls about the point of inflexion. As used herein, the longitudinal direction of any array is intended to mean the direction along which tension is exerted to open up the slits to form the cells according to the process of the invention. The cells produced by the process are of substantially rectangular configuration when viewed in plan.

The cellular material of the invention is particularly suitable for fabrication from chemically inert materials such as plastics materials and impregnated paper. The preferred material is polyvinyl chloride (P.V.C.) which may be softened by heat and hardens to a predetermined shape on cooling. This preferred material also provides a cellular material according to the invention which has dimensional stability and considerable strength against pressure exerted along the substantially vertical walls of the cells. This last property means that sheets of the cellular material may be stacked on top of each other in layers to provide a contact packing structure of considerable mechanical strength while still providing the necessary spacing and surface to volume ratio required for efficient cooling.

As an example of a cellular material made by the process of the present invention, a sheet of P.V.C. having a thickness of 0.010 inch and cut with parallel slits 2 inches long in rows 0.25 inch apart by subsequent extension according to the invention provides a cellular material occupying an overall spatial volume fifty times that of the original sheet. As previously mentioned, subsequent and not concurrent extension after slitting is required as the sheet will reduce in width by up to 30% in the process. This process clearly differentiates the cellular material of the present invention from the prior art expanded plastic sheet from which, due to its mode of manufacture, it is not possible to obtain the degree of stretch and vertical thickness obtained according to the present invention from a given thickness of sheet.

Thus, a cellular material obtained according to the process of the present invention from a sheet of P.V.C. 0.01 inch thick may have an overall thickness of 0.5 inches and be extended in length 2.5 times, i.e. a sheet thickness/cellular material thickness ratio of 0.01/0.5, i.e. 1:50. A typical expanded plastic sheet made according to prior art processes has a corresponding ratio of about 1:4. This low ratio is one of the prime reasons why such prior art sheets have not been used for packing since there is accordingly no strength along the length and breadth of the sheet and a sheet 0.01 inches thick would not, when laid flat, be able to support its own weight for more than a few inches span. Furthermore, the prior art method of making expanded metal or plastics sheet precludes the possibility of any substantial narrowing of the sheet as it is slit so that the substantially rectangular shape of the cells in the cellular material according to the present invention could not be obtained by known techniques.

Known forms of netting and expanding sheets are all limited to a sheet/product thickness ratio of about 1:4 maximum and result in a different form of expansion with no spanning facility. Also, it has been found that when such sheets have been placed flat one on top of each other the open spaces for air flow are substantially blocked with very few layers so that such a packing will have very high resistance to air flow. The increase of sheet/product thickness ratio provided by the cellular material of the present invention eliminates this blocking effect so that a contact packing unit made from layers of the cellular material according to the present invention has a low resistance to air flow.

A further advantage provided by the cellular material according to the present invention arises from the many corners and points of contact provided by the open structure so that when such material is used in biological oxidation plants in units comprising successive layers, these corners and points of contact provide innumerable sites for the formation of the biologically active film.

When building an efficient contact packing, unit layers of the cellular material according to the invention may be superimposed upon each other, preferably at right angles, until the desired depth of fill is achieved. Alternatively, each sheet of the material may lie in the same general direction sheet by sheet or in opposing directions producing a mirror-image effect layer by layer. Furthermore, it is possible that the material may be cut up into small squares or rectangles or discs and introduced into a cooling tower to provide a packing fill.

The invention will be more particularly described with reference to the accompanying drawings in which.

Figure 1:
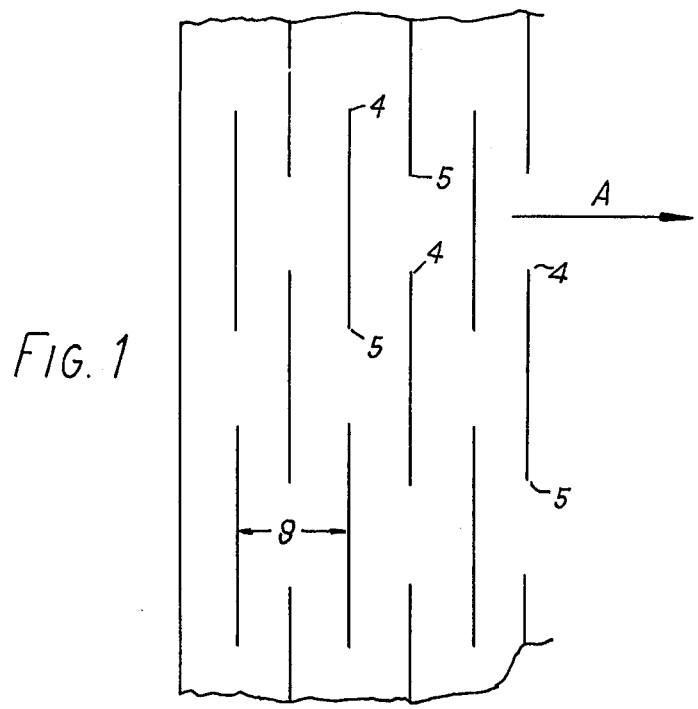
FIG. 1 illustrates a flat sheet showing a series of slits before stretching.
Figure 2:
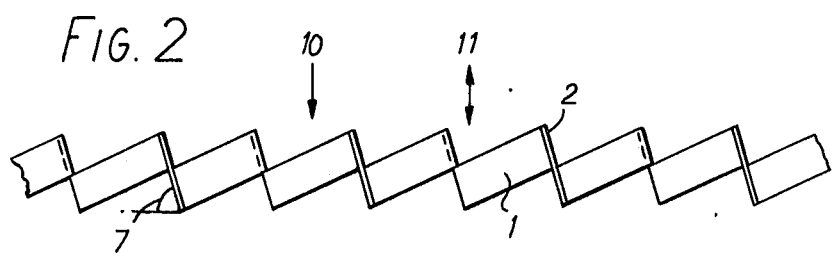
FIG. 2 is an elevation of the cellular material according to the invention.
Figure 3:
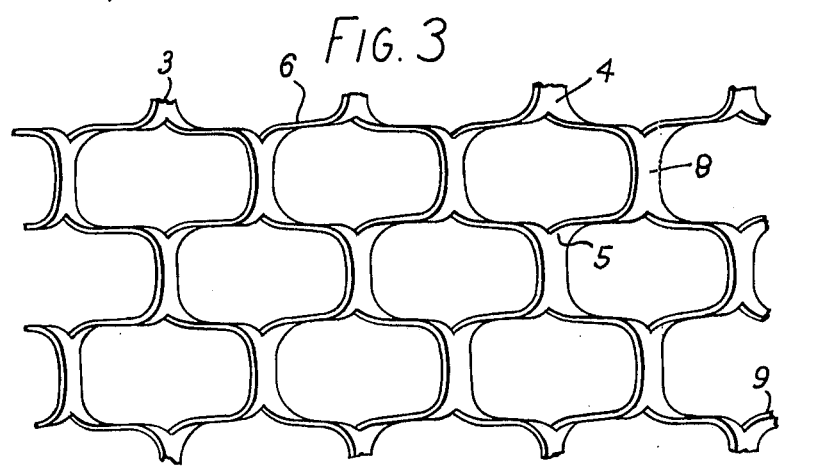
FIG. 3 is a plan view of the cellular material.

Referring to FIG. 1 of the drawings, this shows a portion of the sheet having a plurality of slits therein in substantially parallel rows, each slit being defined by the ends 4 and 5. When the sheet is subsequently subjected to tension along the line of arrow A, after a softening step if required, the tension causes the slits 4, 5 to open out and form substantially rectangular cells as illustrated in FIG. 3, and this also causes the sheet to tilt to a three dimensional configuration wherein the walls of the cells lie in substantially vertical planes, 1 and 2 as illustrated in FIG. 2. The angle between these walls and the general plane of the material after formation is not critical but preferably lies between 30° and 90° as indicated by 7 in FIG. 2. In a preferred embodiment using a sheet having a thickness, 6, within the range of 0.003 inch to 0.2 inch, the depth of the wall at 1 may be from 0.0625 inch to 2.0 inches and resulting from slits having a length 4, 5 from 0.25 inch to 6.0 inches. The sheet of cellular material may extend at 3 and 9 (FIG. 3) for any distance desired but for general practice would probably be longer in the direction 9 than in the direction 3.

Referring to FIG. 2, when layers of the cellular material are used as contact packing in a cooling tower liquid will pass in the direction of arrow 10 and gas may pass in either direction shown by the arrows 11.

It is also possible to suspend the sheet vertically and pass gas horizontally across the sheet while liquid trickles down the sheet. The sheets need not necessarily touch each other but may be separated by an air space.

The angle of the layer of cellular material at 6 with respect to surface 8 may vary from 20° to 90° depending upon how much the original sheet is stretched.

In the manufacture of the cellular material according to the process of the invention from a sheet of plastics material, for example P.V.C., a series of parallel slits is cut in the sheet, as shown in FIG. 1, and the sheet is then passed through a heated chamber where the plastics material is softened. The sheet is drawn from the chamber at a rate faster than it enters so that the slits are opened out to form an array of cells. The resulting cellular material is then cooled to harden the plastics material and set the position of the cells.

As an alternative to plastics material, the cellular material may be made from paper or other similar materials which may be sprayed with a fixative to harden it in the correct position. Alternatively, the sheet may be previously impregnated with a chemical that hardens under heat after slitting and stretching.

As well as a plain sheet, the original sheet from which the ceullular material is made alternatively may be an expanded or mesh sheet.

I claim:

1. A cellular contact packing material produced from a planar sheet of material which has an initial thickness within the range of 0.003 inch to 0.2 inch and is capable of setting in a desired configuration by a process which comprises cutting in the said sheet separate linear slits, each having an equal length of from 0.25 inch to 6.0 inches, in a series of substantially parallel linear rows to form an array wherein each of the slits in a given row is out of phase with each of the slits in the adjacent row in a regular pattern as illustrated in FIG. 1 of the drawings, subsequently subjecting the sheet to tension in a direction perpendicular to the linear rows of slits, maintaining the tension until the slits have opened up to form a three-dimensional integral array comprising a plurality of cells of substantially rectangular configuration when viewed in plan wherein each of the opposite side walls of each cell in a longitudinal direction has an intermediate point of inflexion and each of the opposite side walls of each cell in a transverse direction has a thickness equal to the sum of thickness of each portion of the longitudinal side walls about the point of inflexion, and causing the resulting cellular material to harden in the substantially rectangular configuration, wherein the resulting cellular material has an overall thickness of from 0.0625 inch to 2.0 inches.

2. A cellular material according to claim 1, in which the sheet material from which the cells are formed is polyvinyl chloride.

3. A cellular material according to claim 2, in which the thickness of the initial sheet is 0.01 inch and the overall thickness of the cellular material is 0.5 inch, providing a sheet thickness/cellular material thickness ratio of 1:50.

* * * * *